(12) United States Patent
Marshall

(10) Patent No.: US 7,299,457 B2
(45) Date of Patent: Nov. 20, 2007

(54) SYSTEM AND METHOD FOR REPORTING USER INTERACTION WITH A WEB SITE

(75) Inventor: John Marshall, Santa Cruz, CA (US)

(73) Assignee: ClickTracks Analytics, Inc., Santa Cruz, CA (US)

( * ) Notice: Subject to any disclaimer, the term of this patent is extended or adjusted under 35 U.S.C. 154(b) by 612 days.

(21) Appl. No.: 10/348,211

(22) Filed: Jan. 16, 2003

(65) Prior Publication Data

US 2003/0160820 A1    Aug. 28, 2003

Related U.S. Application Data

(60) Provisional application No. 60/350,126, filed on Jan. 18, 2002.

(51) Int. Cl.
*G06F 9/44* (2006.01)

(52) U.S. Cl. .................................... 717/131

(58) Field of Classification Search ............... 717/131, 717/105, 109, 125, 127; 715/745; 702/187–188, 702/183
See application file for complete search history.

(56) References Cited

U.S. PATENT DOCUMENTS 6,282,548 B1 *  8/2001  Burner et al. ............ 707/104.1
6,654,735 B1 * 11/2003  Eichstaedt et al. ............ 707/3
6,978,378 B1 * 12/2005  Koretz ........................ 713/193
2002/0070953 A1 *  6/2002  Barg et al. .................. 345/700
2003/0101024 A1 *  5/2003  Adar et al. .................. 702/187

OTHER PUBLICATIONS

Audris Mockus, et al. "A Web-Based Approach to Interactive Visualization in Context", May 2000, ACM Press, pp. 181-188.*
Laila Paganelli, et al. "Intelligent Analysis of User Interactions with Web Applications", Jan. 13-16, 202, ACM Press, pp. 111-118.*
James Robertson, The Value of Web Statistics, Feb. 27, 2002, Intranet Journal, pp. 1-4, available at <http://intranetjournal.com/articles/200202/pkm_02_02a.html>.
SD-Graph, Dec. 1, 2002, Spriteworks Development, pp. 1-2, available at <http://www.spriteworks.com>.
Suhit Gupta, DOM-based content extraction on HTML documents, 2003, ACM Press, pp. 207-214.

* cited by examiner

*Primary Examiner*—Wei Zhen
*Assistant Examiner*—Anna Deng
(74) *Attorney, Agent, or Firm*—Charles E. Krueger

(57) ABSTRACT

A software product that analyses a website and produces reports that indicate how the users interact with the site. The operator of the site uses the reports to improve the site layout, design or content in order to increase user satisfaction.

12 Claims, 3 Drawing Sheets

SYSTEM AND METHOD FOR REPORTING USER INTERACTION WITH A WEB SITE

This application claims priority from a provisional patent application entitiled SYSTEM AND METHOD FOR REPORTING USER INTERACTION WITH A WEB SITE, application Ser. No. 60/350,126 filed Jan. 18, 2002.

BACKGROUND OF THE INVENTION

A website is stored on a central computer known as the web server. As depicted in FIG. 1, users around the world equipped with web browser software can enter the name of the website (URL) and see the pages comprising the site.

By clicking HyperLinks within each page on the site the user navigates from page to page. A typical web page shows the links underlined as depicted in FIG. 2. As user clicks on the links the web server records information into a file known as the log file. The specific format and information written to the file varies slightly according to the web server software being used and the way the web site is structured, but the following information at least is recorded:

IP Address of client (user)
Date & time
Type of request
Type of response from server
URL requested
Referring URL
Cookie information from user
Type of browser used on client Log File Analysis Software programs exist that take the log file produced from the server and generate statistical information. These programs display, for example, the average length of time each user spends on each page, or the path they take from page to page.

Many of these existing analysis programs are hard to use. Although they display the data gathered from the log file, it is not displayed in the context of the website to which it relates. It is very hard for the user to understand which pages on his website are successful (people stay on that page for long periods).

BRIEF SUMMARY OF THE INVENTION

One embodiment is a software product that analyses a website and produces reports that indicate how the users interact with the site. The operator of the site uses the reports to improve the site layout, design or content in order to increase user satisfaction.

DETAILED DESCRIPTION OF THE INVENTION

Figure 1:
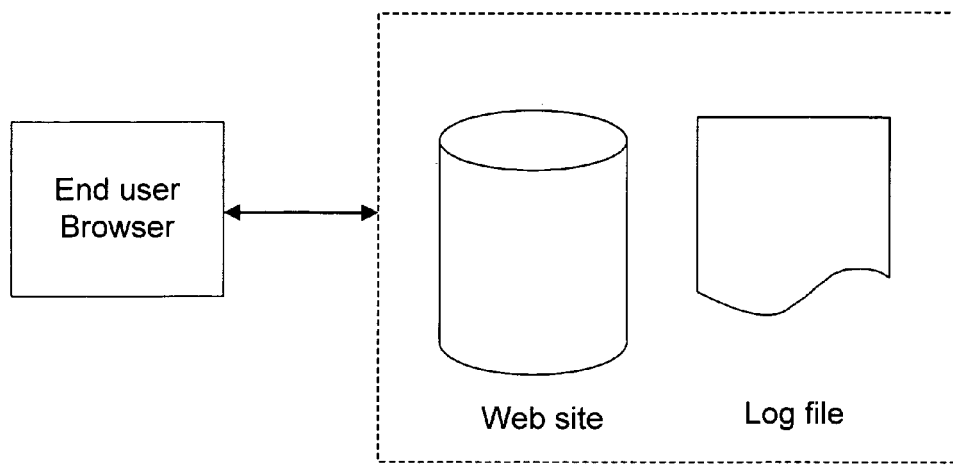
FIG. 1 is a block diagram of a browser-server system.
Figure 2:
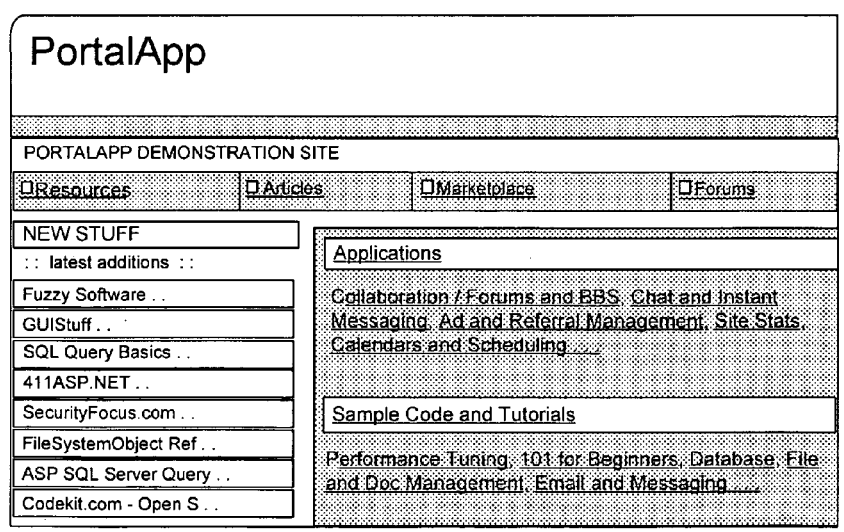
FIG. 2 depicts a typical web browser page.

The invention will now be described with reference to specific embodiments by way of example not limitation. In the drawings like or similar parts in different views have the same reference number. In the following the various embodiments of the invention are referred to as Rorschach.

First Embodiment: Displaying statistical data overlayed on the website.

Figure 3:
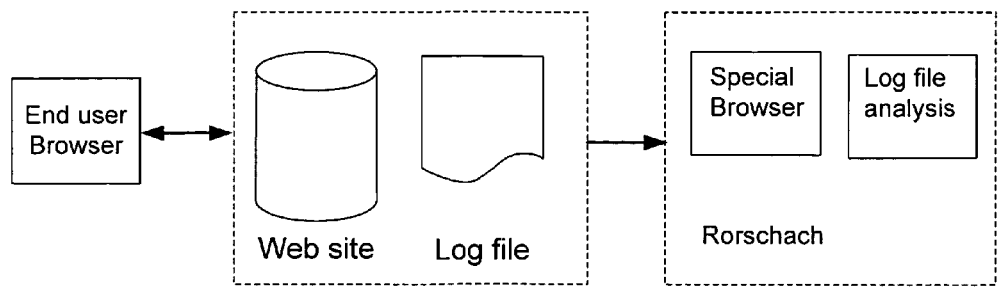
FIG. 3 is a block diagram of an embodiment of the invention.
Figure 4:
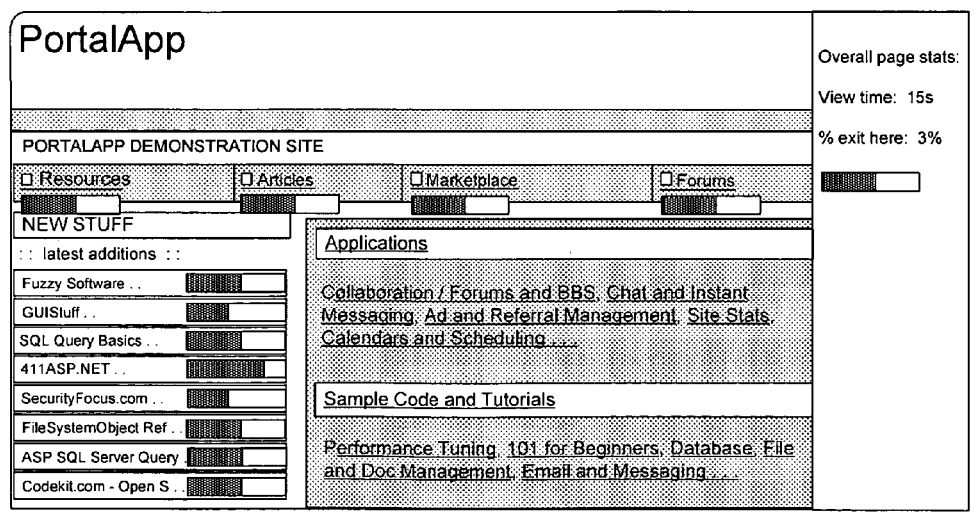
FIG. 4 depcits a web page and statistics.

Rorschach combines the functionality of a web browser with the log file analysis as described above. The web site operator browses through his own site, requesting URLs for the pages of interest. Rorschach provides the UI for browsing, including the URL field and forward/backward buttons. Rorschach takes the URL currently being shown in the browser and compares this to the list of URLs counted from the log file. It superimposes over the the page statistics relevant to the links within that page, for example calculating how many users followed particular links from this page to others as depicted in FIGS. 3 and 4.

Rorschach displays next to each link the % of users following that link from the displayed page. To the right of the page it also displays statistics that are relevant to the page as a whole, such as the average length of view time.

As the web site operator uses Rorschach to browse his own site, Rorschach is continuously comparing the current page shown with the statistics generated from the log file.

It is the presentation of the statistical data superimposed over the site that is a key feature of Rorschach and is unique. The web site owner can very quickly see how his users are navigating around the site, and how long they spend on any one page. The owner can immediately see potential problems in the design of the site if the number of users following a link is unexpectedly low.

Rorschach takes the log file and extracts the data that describes user interaction. In particular it examines the URL of the page displayed, maintaining a system of counters that tracks how many users visit each page, which page they came from (referrer), how long they spend viewing a page etc.

Comparing Pages

Rorschach needs to be able to take the URL of the page being viewed and compare that to the URLs of pages counted from the log file so that the charts can be calculated. The design of many websites creates a barrier to doing this, however. A URL comprises three main components: the domain, the page requested and optionally parameters to the page:

```
http://www.portalapp.com/717/links.asp?CatId=%206
Domain:         www.portalapp.com/
Page            /717/links.asp
Parameters:     CatId=%206
```

The web server uses the parameters to keep track of individual users or to refine the data within the page that the user will receive. A parameter of 'CatId=1' could show products that are in the 'office products' category and a value of 2 could indicate 'food items'. Clearly these pages are different and must be recognized as such by Rorschach.

Parameters are also used to track users through what is commonly known as a session ID. The session ID is a value that is unique to each user on the site, often appearing as 'SessionID=ABC123DEF'.

A page could easily contain both parameters of this type. If Rorschach performs a simple text string comparison of the URL in the browser with the URLs from the log file, it will find no matches and therefore erroneously state that no users followed the link, because the session ID is a unique string for each user.

Figure 5:
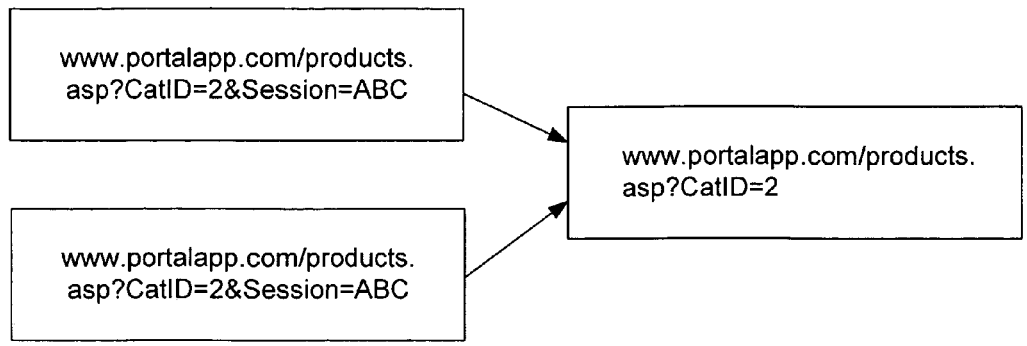
FIG. 5 is a flow chart.

Rorschach solves this by breaking URLs into the domain, the page and the parameters list as described above. It further breaks the parameter list into a set of individual parameters for each page. As depicted in FIG. 5, at a simple level the user can select from this of parameters and instruct Rorschach to ignore certain parameters when considering whether the page being viewed matches other pages in the log file. In the above case the 'sessionid' would be ignored, while the CatId would be retained.

Second embodiment: Automatically computing which parameters to eliminate and which to keep.

Figure 6:
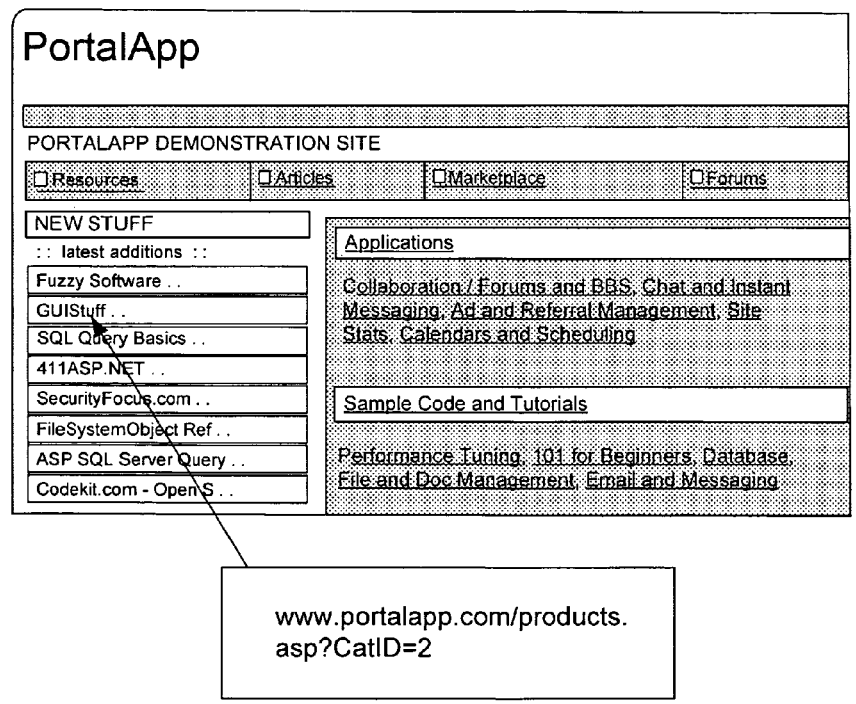
FIG. 6 depicts a web page and a tag.

Referring to FIG. 6, The user of Rorschach would normally have to specify for each page of the site the parameters which should be stripped from the URL before comparing/counting. Given the large number of parameters on multiple pages that are typical of even modestly complex websites, the task quickly becomes difficult and error prone.

Rorschach avoids this problem by intelligently guessing which parameters are statistically relevant and which can be stripped, as follows:

The program analyzes a sample of the web logs of visitors to a site.

The program creates a list of all the parameter names in the sample.

The program counts the number of distinct values for each parameter name.

The program calculates a score for each parameter. One possible scoring function is to divide the total number of distinct values by the total number of occurrences of that parameter name.

The program builds a list of parameters whose score is below a certain threshold. When the program later generates the page identifiers, it first checks this list to see if it should ignore any parameters.

This threshold can be dynamically adjusted at run-time to arrive within a desired range of distinct pages.

Knowing that 5% of users follow a link on a page is not useful in all situations. A better way to measure link activity is to divide visitors to a site into distinct groups and determine how they behave compared to the entire population, or compared to another group. For example, users entering the site from two different marketing campaigns could be compared to see if they follow the same links, and view pages for the same period.

Tagging Users to Identify Groups and Patterns

Rorschach introduces a concept called 'tagging' visitors. A user can be identified by a number of attributes, such as: the page they entered the site from, the first page on the site they viewed, a certain page they visited etc. Rorschach permits a tag to be created using any of these such attributes. All users meeting the specified criteria are then counted counted as being part of the tagged group.

It is common for websites to use an intermediate page to identify which banner ad has brought the user to the site. The user of Rorschach would use the tagging feature to identify the different groups of users coming from each banner ad. Statistical data can now be displayed that compares one group of tagged users versus another. Differences in links traveled will be highlighted.

The tagging system works as follows:

The program presents several views of the data to the user.

The user can select various elements in these views. For example, the program has a tree representation of the web site, from which the user can select a page or a link.

The user can create tags from these elements. The criteria used to determine if a user is a member of a tagged group is determined from the element and view the user selected to create the tag.

Later, when the program is analyzing the web logs, the program collects statistics on each of the tagged groups defined by the user.

The invention has now been described with reference to the preferred embodiments. Alternatives and substitutions will now be apparent to persons of skill in the art. Accordingly, it is not intended to limit the invention except as provided by the appended claims.

What is claimed is:

1. Software encoded on one or more computer readable media when executed operable to:

analyze, at a web site of interest, gathered link clicking history information data, relating to link clicking user interaction with a plurality of web pages included in the web site of interest, in response to a requested URL of a particular web page within the web site of interest by comparing the requested URL to a list of URLs of the plurality of web pages in the web site of interest to generate statistics relating to link clicking user interaction with the requested URL of the particular web page, where the display of the particular web page includes displayed links at specified locations within the display of the particular web page; and display an enhanced page having a graphical representation of statistics relating to user interaction superimposed over a display of the particular web page, where the enhanced display includes data showing the interaction of users that followed each link from the particular page, and where data showing the interaction of users that followed a particular link is displayed inside the display of the particular web page in close adjacency to the specified location of the particular link in the display of the particular web page so that statistics related to link clicking user interaction with links displayed in the display of the particular web page can be viewed in the context of the display of the particular web page.

2. The software of claim 1 when executed further operable to:

refine statistics generated for the requested URL based on parameters within the URL, where a URL includes a domain, a page requested, and parameters to the page.

3. The software of claim 2 when executed operable to refine statistics further operable to:

refine the URL into domain, page, and parameters lists;

break the parameters list into individual parameters for each page; and retain certain parameters and ignore other parameters when analyzing the usage data to generate relevant statistics.

4. The software of claim 3 when executed further operable:

analyze statistical variances in the occurrences of the parameters to automatically identify the parameters that should be ignored and the parameters that should be retained using a scoring system.

5. The software of claim 4 when executed further operable:

allow a user to dynamically change the individual parameters that should be retained or ignored.

6. The software of claim 2 when executed operable to refine statistics further operable to:

include a panel adjacent to a displayed enhanced page; and display a graphical representation of statistics in the panel.

7. A method comprising:

analyzing, at a web site of interest, gathered link clicking history information usage data, relating to link clicking user interaction information with a plurality of web pages included in the web site of interest, in response to a requested URL of a particular web page within the web site of interest by comparing the requested URL to a list of URLs in the plurality of web pages in the web site of interest to generate statistics relating to link clicking user interaction information with the requested URL of the particular web page, where the display of the particular web page includes displayed links at specified locations within the display of the particular web page; and displaying an enhanced page having a graphical representation of statistics relating to user interaction information of the requested URL superimposed over a display of the particular web page, where the enhanced display includes data showing the interaction of users that followed each link from the particular page, and where data showing the interaction of users that followed a particular link is displayed inside the display of the particular web page in close adjacency to the specified location of the particular link in the particular web page so that statistics related to link clicking user interaction with links displayed in the display of the particular page can be viewed in the context of the display of the particular page.

8. The method of claim 7 where a URL includes a domain, a page requested, and parameters to the page, the method further comprising:

refining statistics generated for the requested URL based on parameters within the URL.

9. The method of claim 8 where the step of refining comprises:

breaking the URL into domain, page, and parameters lists;

breaking the parameters list into individual parameters for each page; and retaining certain parameters and ignoring other parameters when analyzing the usage data to generate relevant statistics.

10. The method of claim 9 further comprising:

analyzing statistical variances in the occurrences of the parameters to automatically identify the parameters that should be ignored and the parameters that should be retained using a scoring system.

11. The method of claim 10 further comprising:

allowing a user to dynamically change the individual parameters that should be retained or ignored.

12. The method of claim 7 further comprising:

including a panel adjacent to a displayed enhanced page; and displaying a graphical representation of statistics in the panel.

* * * * *